(12) United States Patent
Betts et al.

(10) Patent No.: US 7,046,798 B2
(45) Date of Patent: May 16, 2006

(54) SYSTEM AND METHOD FOR SUBLIMINAL TIME DOMAIN DUPLEXING

(75) Inventors: William L. Betts, St. Petersburg, FL (US); Gordon F. Bremer, Largo, FL (US); Rafael S. Martinez, Clearwater, FL (US)

(73) Assignee: Paradyne Corporation, Largo, FL (US)

( * ) Notice: Subject to any disclaimer, the term of this patent is extended or adjusted under 35 U.S.C. 154(b) by 274 days.

(21) Appl. No.: 10/654,718

(22) Filed: Sep. 3, 2003

(65) Prior Publication Data

US 2004/0052361 A1 Mar. 18, 2004

Related U.S. Application Data

(60) Provisional application No. 60/407,915, filed on Sep. 3, 2002.

(51) Int. Cl.
*H04B 1/56* (2006.01)
*H04M 1/74* (2006.01)

(52) U.S. Cl. ................ 379/417; 370/201; 370/280; 370/286

(58) Field of Classification Search ........... 379/417; 370/201
See application file for complete search history.

(56) References Cited

U.S. PATENT DOCUMENTS

| 5,400,322 | A | | 3/1995 | Hunt et al. ............... 370/19 |
|---|---|---|---|---|
| 5,521,906 | A | * | 5/1996 | Grube et al. ............ 370/252 |
| 6,201,830 | B1 | * | 3/2001 | Chellali et al. .......... 375/222 |
| 6,885,699 | B1 | * | 4/2005 | Verbin .................... 375/222 |

OTHER PUBLICATIONS

"Multicarrier Modulation for Data Transmission: An Idea Whose Time Has Come" by John A.C. Bingham, Published May 1990 in IEEE Communications Magazine.

* cited by examiner

*Primary Examiner*—Daniel Swerdlow
(74) *Attorney, Agent, or Firm*—Thomas, Kayden, Horstemeyer & Risley LLP

(57) ABSTRACT

The present invention provides methods and apparatus for transmitting a data-bearing signal and a non-data-bearing signal. One embodiment comprises communicatively coupling a data-bearing signal during a first time period and communicatively coupling a non-data-bearing signal during a second time period. The data-bearing signal has a first PSD. The non-data-bearing signal has a second PSD substantially the same as the first over a range of frequencies. The non-data-bearing signal has characteristics facilitating echo cancellation. Another embodiment comprises a line interface and a transmitter coupled to the line interface, comprising a data encoder and a periodic signal generator. The encoder is configured to produce a data-bearing signal with a first PSD. The periodic signal generator is configured to produce a non-data-bearing signal with a second PSD. The second PSD is substantially the same as the first PSD over a first range of frequencies. The non-data-bearing signal has characteristics facilitating echo cancellation.

21 Claims, 6 Drawing Sheets

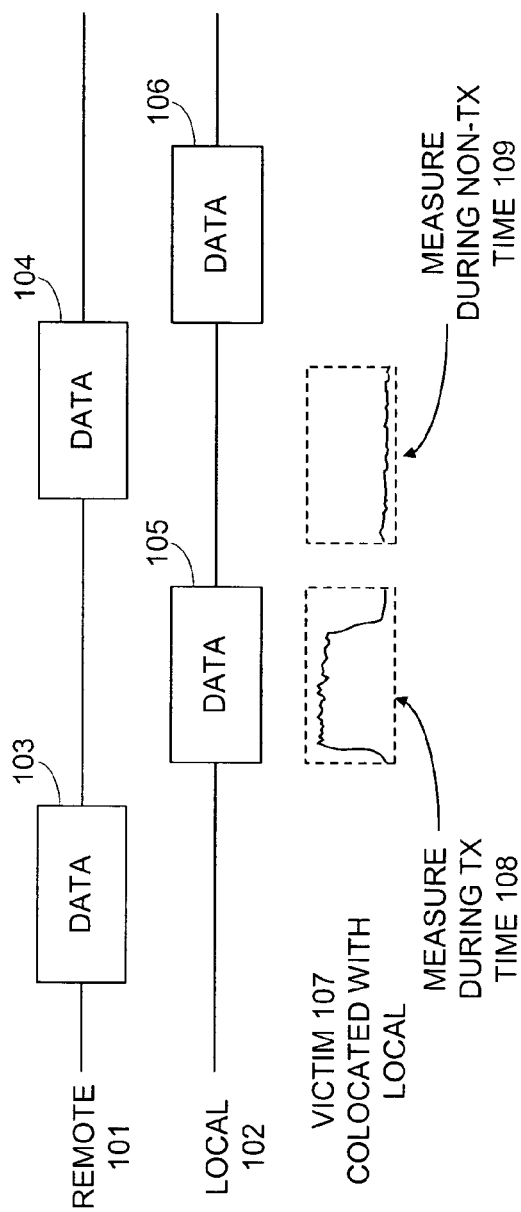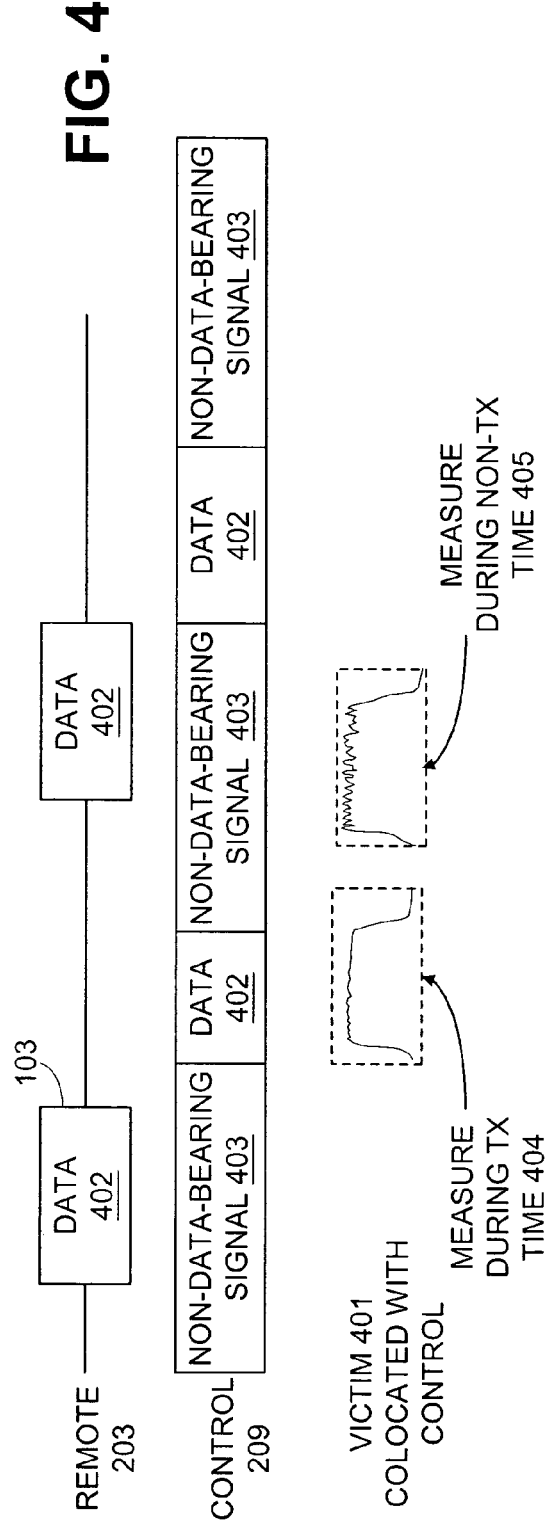

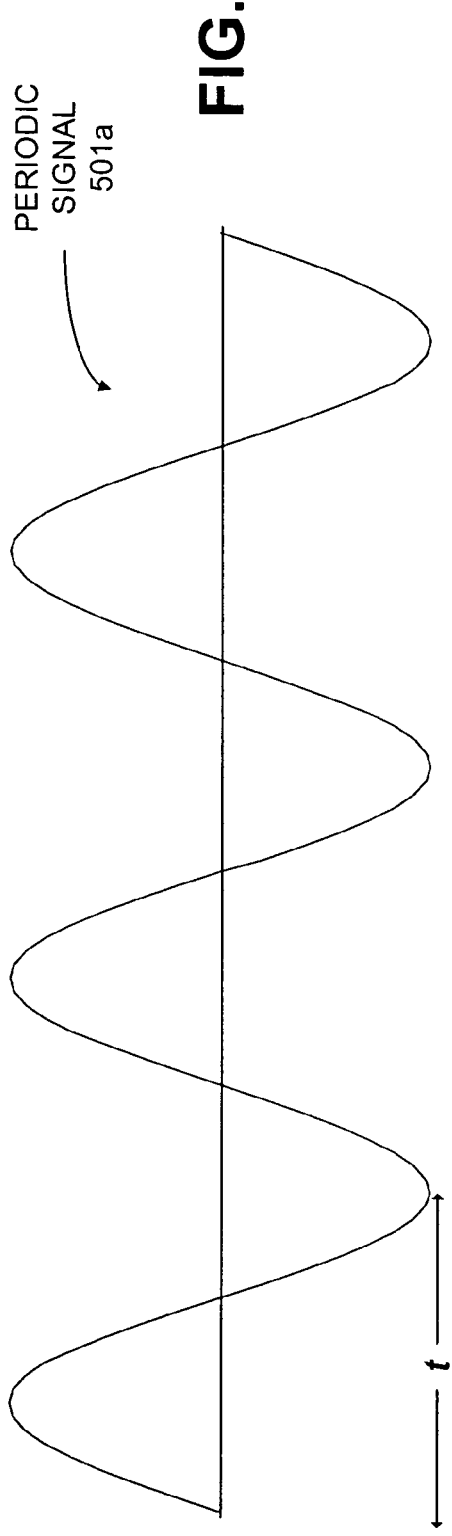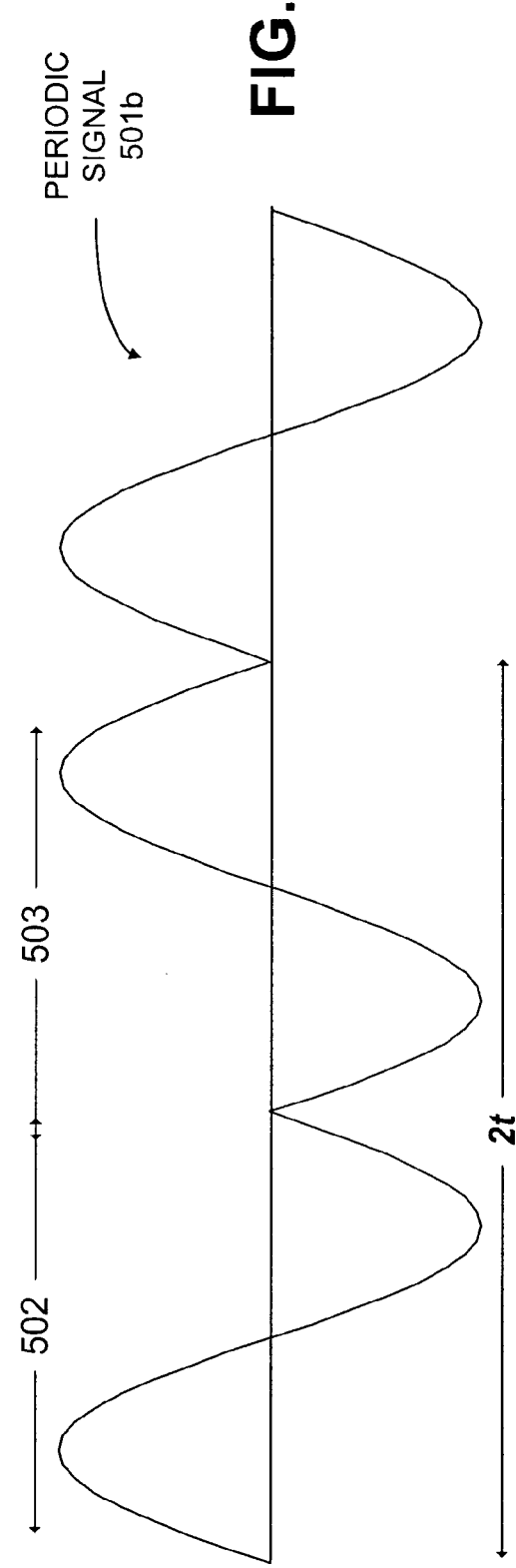

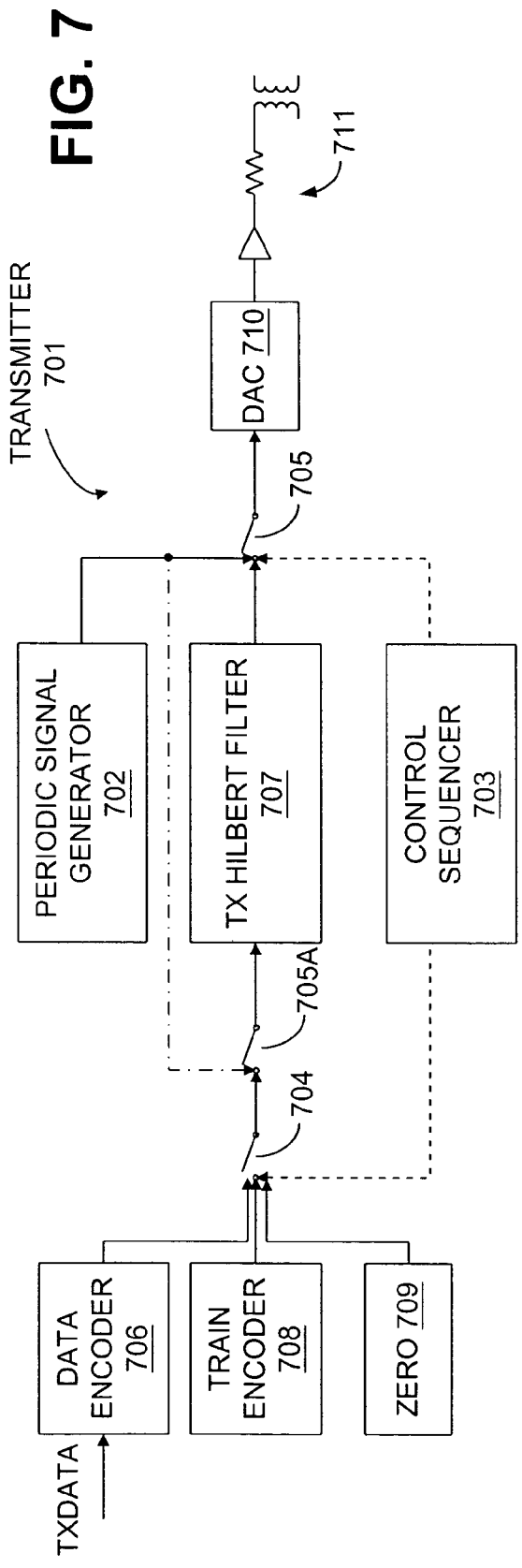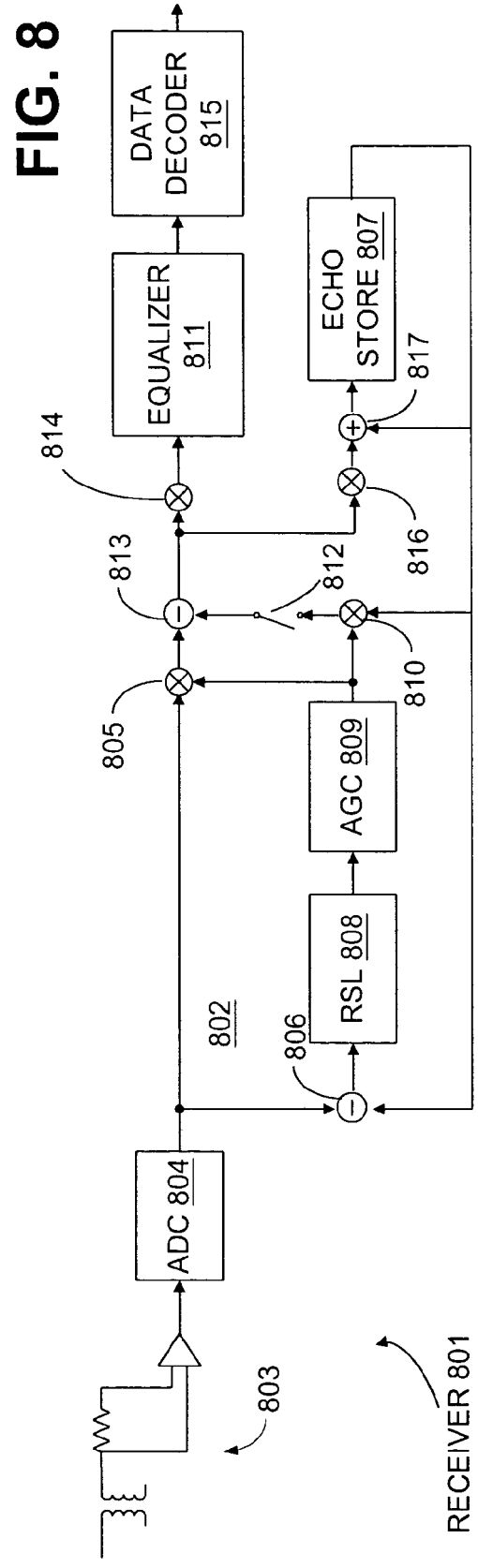

SYSTEM AND METHOD FOR SUBLIMINAL TIME DOMAIN DUPLEXING

CROSS-REFERENCE TO RELATED APPLICATION

This application claims the benefit of U.S. Provisional No. 60/407,915, filed Sep. 3, 2002.

FIELD OF THE INVENTION

The present invention relates generally to data communications, and more particularly, to a system and method for transmitting a data-bearing signal and a non-data-bearing signal that has characteristics that facilitate echo cancellation.

BACKGROUND

Crosstalk is a well-known phenomenon in which an electrical signal transmitted on one wire pair in a cable bundle causes interference on other pairs in the same cable. This interference by a "crosstalk disturber" can result in data errors for communications equipment using the affected pair ("crosstalk victims"), such as analog modems, ISDN adapters, and DSL modems. Various techniques are used to reduce errors resulting from crosstalk. For example, some DSL modems test the wire pair when initializing a connection, and only utilize those parts of the spectrum that have low crosstalk impairment.

This technique is of limited value when the disturber uses time domain duplexing (TDD), as explained by FIG. 1. Remote device 101 and local device 102 are modems at two ends of a DSL connection. Remote device 101 and local device 102 take turns transmitting, with only one of the transmitters active at any one time. In this example, remote device 101 transmits during period 103 and period 104, while local device 102 transmits during period 105 and period 106. Victim device 107 is another communications device using a wire pair colocated with the pair used by local device 102, and therefore a victim subject to possible crosstalk from local device 102. Local device 102 is the disturber.

In order to minimize the effect of crosstalk, victim device 107 measures impairments at the start of a connection, and adjusts spectrum usage to avoid any frequency ranges that are strongly affected by crosstalk. The effectiveness of this strategy depends on whether or not the disturber (local device 102) is actually transmitting at the same time that victim device 107 measures the line impairments. If the victim device 107 measures at time 108, this is an accurate measurement, because the measurement time 108 coincides with the period 105 when the disturber is transmitting. However, if the crosstalk victim device 107 measures at time 109, this is inaccurate because the disturber is not transmitting at this time. Since crosstalk victim device 107 has no information about when the disturber (local device 102) transmits, the effectiveness of the crosstalk avoidance strategy when used with TDD disturbers is unpredictable. A need therefore exists to address these and other shortcomings in the prior art.

SUMMARY

The present invention is directed to unique methods and apparatus for communicatively coupling a data-bearing signal and a non-data-bearing signal, where the non-data-bearing signal has characteristics that facilitate echo cancellation. One representative embodiment comprises the steps of: sending a data-bearing signal during a first time period; and sending a non-data-bearing signal during a second time period. The data-bearing signal has a first PSD, and the non-data-bearing signal has a second PSD substantially the same as the first PSD over a first range of frequencies. The non-data-bearing signal has characteristics that facilitate echo cancellation.

Another embodiment, among others, comprises a line interface and a transmitter coupled to the line interface. The transmitter further comprises a data encoder and a periodic signal generator. The data encoder is configured to produce a data-bearing signal with a first PSD. The periodic signal generator is configured to produce a non-data-bearing signal with a second PSD. The second PSD is substantially the same as the first PSD over a first range of frequencies. The non-data-bearing signal has characteristics that facilitate echo cancellation.

DESCRIPTION OF THE DRAWINGS

The accompanying drawings illustrate several aspects of the present invention, and together with the description serve to explain the principles of the invention.

FIG. 1 illustrates a prior art system, with the crosstalk victim testing the wire pair and a TDD disturber colocated with the wire pair.

FIG. 4 is another view of the communications system of FIG. 2, with the crosstalk victim testing the wire pair and a TDD disturber colocated with the wire pair.

FIG. 5A is a graph of a simple periodic signal used by the control device of FIG. 3.

FIG. 5B is a graph of another periodic signal used by another embodiment of the control device of FIG. 3.

FIG. 7 is a block diagram of an example embodiment of a transmitter in the control device of FIG. 3.

FIG. 8 is a block diagram of an example embodiment of a receiver in the control device of FIG. 3.

DETAILED DESCRIPTION

Figure 2:
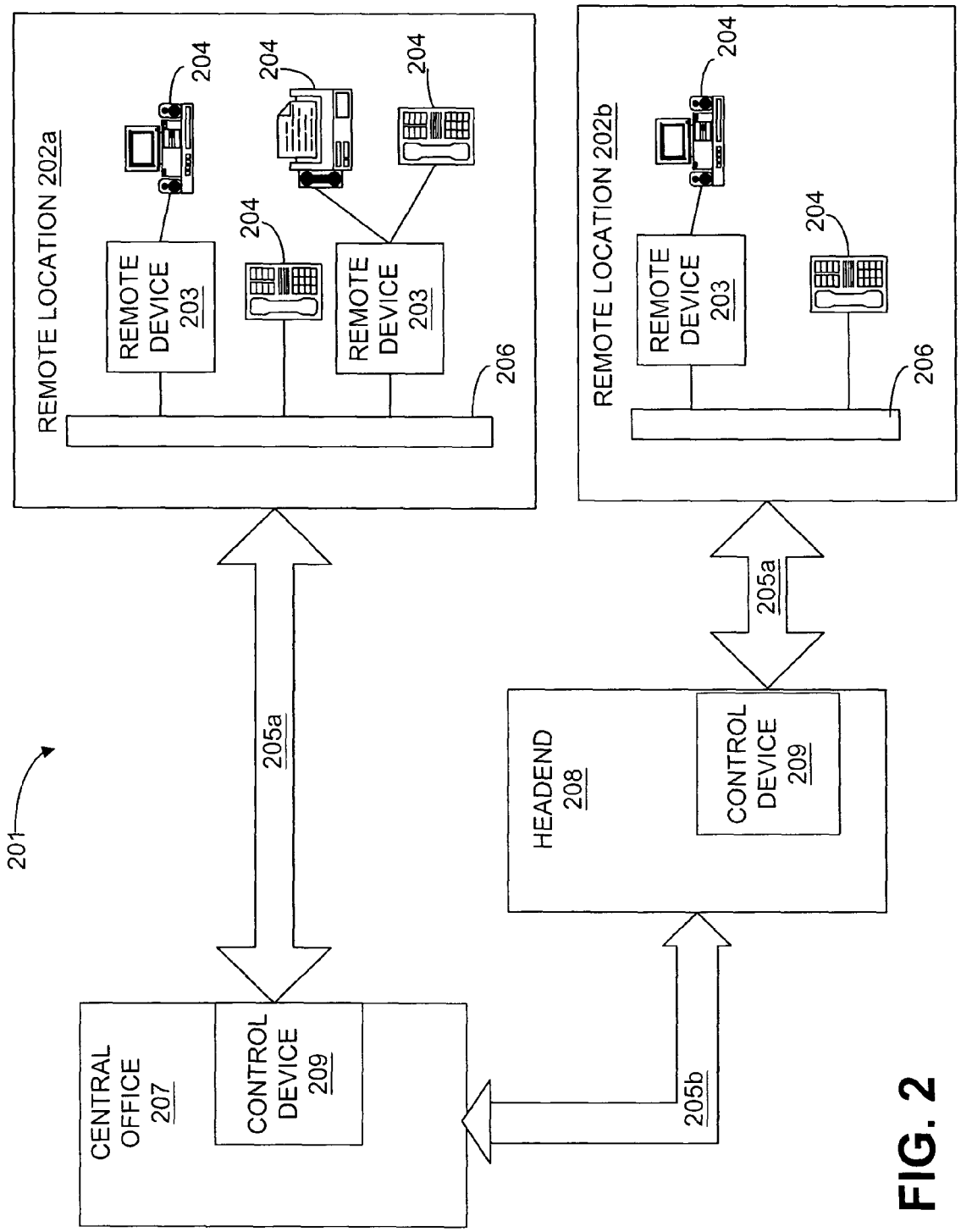
FIG. 2 is a block diagram illustrating a multipoint communications system in which devices employing the subliminal time domain duplex modulation (STDD) modulation of the present invention are used.

Having summarized the inventive concepts of the present invention, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

The present invention can be implemented in software, hardware, or a combination of the two. In the preferred embodiment, the elements of the present invention are implemented in software that is stored in a memory and that configures and is executed by a suitable digital signal processor (DSP) situated in a communication device. However, this software can be stored on any computer-readable medium, for transport or for use by or in connection with any suitable computer-related system or method. In the context of this document, a computer-readable medium is an electronic, magnetic, optical, or other physical device or means that can contain or store a computer program for use by or in connection with a computer-related system or method.

The present invention is generally directed to methods and apparatuses for subliminal time domain duplex modulation (STDD). A transmitter in a conventional TDD system transmits a data-bearing signal during specific time periods, and does not transmit at all during the remaining time periods. A transmitter in an STDD system implemented in accordance with the invention transmits a data-bearing signal during specific time periods, and a non-data-bearing signal during the remaining time periods. The non-data-bearing signal has the same power spectrum density (PSD) as the data-bearing signal, and has characteristics that facilitate echo cancellation by the transmitter.

FIG. 2 is a block diagram illustrating a multipoint communications system 201 in which devices employing the STDD modulation of the present invention are used. Remote location 202a contains one or more remote devices 203. Each remote device 203 connects one or more user devices 204 to communication channel 205a via communication bus 206. In addition, user devices such as telephones may be connected directly to communication bus 206. Communication bus 206 is illustratively the copper wiring infrastructure used throughout a remote location to connect remote devices 203 to communication channel 205.

Communication channel 205 is typically the copper wire pair that extends between a telephone company central office and a remote residential, business, or any other location served by local telephone service. Communication channel 205 connects remote location 202 to either central office 207 or headend 208. Control device 209 is located at central office 207 or headend 208.

As is well-known in the art, central office 207 contains a switch, and acts to connect remote devices 203 to the public switched telephone network (PSTN). Headend 208 is usually located close to a relatively small group of subscribers, for example, a neighborhood. Headend 208 contains a group of modems used in common by the group of subscribers, and is connected to each subscriber pair in the group. Headend 208 is connected to central office 207 by communication channel 205. Both headend 208 and central office 207 are capable of communicating with multiple remote locations 202 and multiple remote devices 203.

In the preferred embodiment, control device 209 and remote device 203 are illustratively digital subscriber line (DSL) communication devices. However, the concepts of the present invention are applicable to various other types of communication devices.

Signal generating sources may be located in the vicinity of remote device 203 or in the vicinity of control device 209. For example, switching relay devices located at central office 207 or headend 208 can impart random impulse noise or crosstalk to the communication channel, thus impairing the subscriber line connecting control device 209 to remote device 203.

The subscriber line connecting control device 209 to remote device 203 can be degraded more severely by transmissions from the headend 208. This is true because headend 208 may be located in a cross-connect box between the central office 207 and remote location 202, so that the power of the communicated signals has been attenuated by the long communication channel. By using control device 209 and remote devices 203 employing STDD of the present invention, it is possible for the receiver located in either remote device 203 or control device 209 to efficiently measure crosstalk generated in its own vicinity and elsewhere in the communication system.

Figure 3:
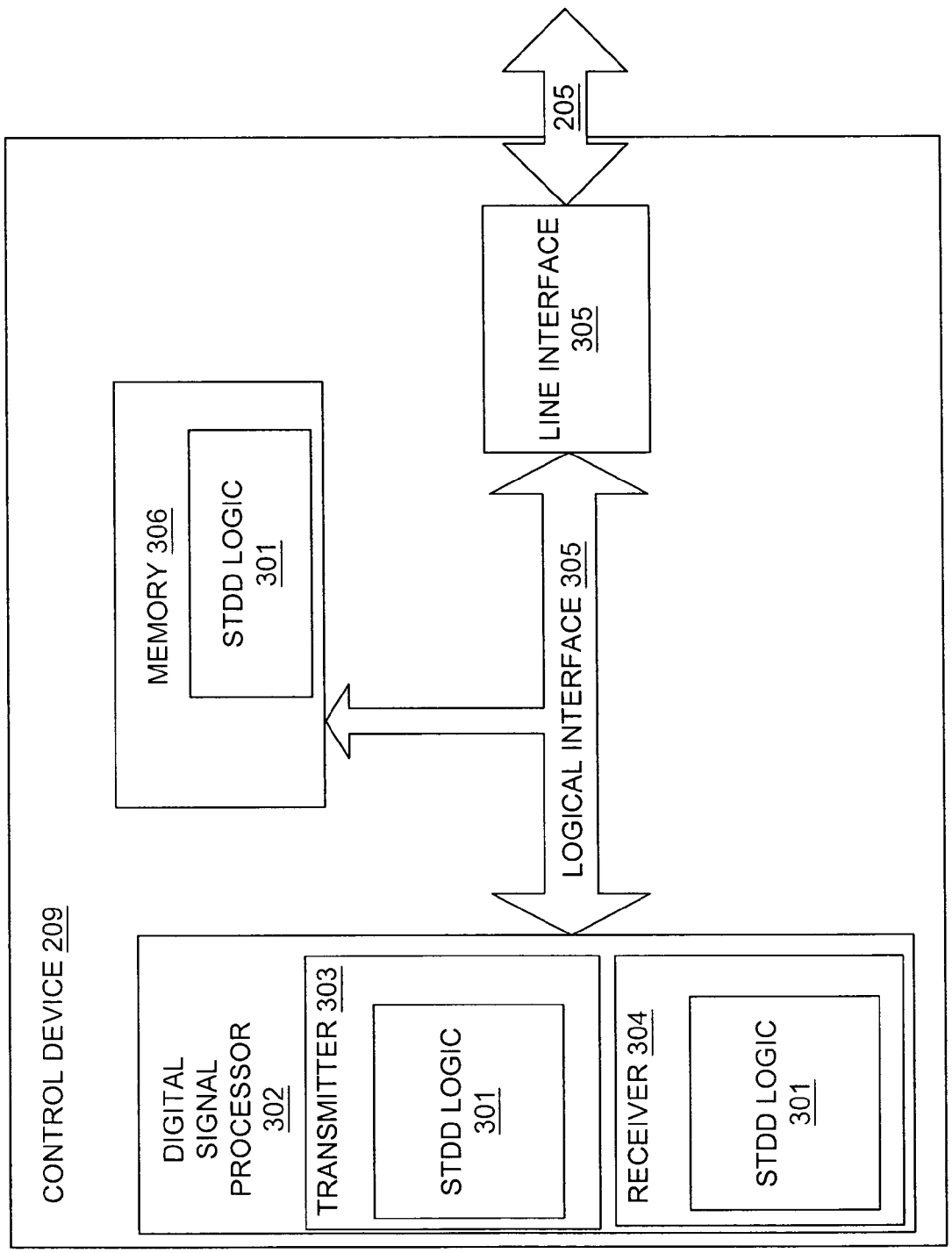
FIG. 3 is a block diagram illustrating the control device of FIG. 2, including the (STDD) modulation logic of the present invention.

FIG. 3 is a block diagram illustrating the control device 209 of FIG. 2, including the STDD modulation logic of the present invention. Typically, control device 209 will transmit signals to remote devices 203 over communications channel 205. Similarly, remote devices 203 will transmit signals to control device 209. Control device 209 contains STDD modulation logic 301, which enables the device to transmit a non-data-bearing signal when not transmitting data, and to cancel the echo from the non-data-bearing signal.

Control device 209 contains conventional components as is known in the art of data communications. For example, digital signal processor (DSP) 302 controls the operation of transmitter 303 and receiver 304, and couples to line interface 305 to gain access to communications channel 205. Also included in transmitter 303 and receiver 304 is memory 306 which includes STDD modulation logic. In one embodiment, the STDD modulation logic of the present invention is executed within DSP 302 and is therefore shown as residing in both DSP 302 and memory 306.

For simplicity, the system and method for STDD modulation is described as residing in the transmitter and receiver of control device 209. However, the systems and methods of the present invention can be applied to any communication transmitter and receiver, including the transmitter and receiver located in remote device 203.

FIG. 4 is another view of the communications system 201 of FIG. 2, with the crosstalk victim testing the wire pair and a TDD disturber colocated with the wire pair. Remote device 203 and control device 209 are modems at two ends of a DSL connection, as shown in FIG. 2. Victim device 401 is another communications device using a wire pair colocated with the pair used by control device 209. Victim device 401 is therefore a victim subject to possible crosstalk from control device 209. Control device 209 is the disturber.

Remote device 203 and control device 209 take turns transmitting data signal 402, with only one of the transmitters sending data signal 402 at any one time. (While each data transmission is represented by the same data signal 402, the data contained in the signal will of course vary from transmission to transmission). When the transmitter in control device 209 is not sending data signal 402, it sends a non-data-bearing signal 403 which has the same power spectral density (PSD) as data signal 402. In some TDD systems, data is transmitted for a fixed time period, while in others the period of data transmission can vary, with a guard time in between to let the remote end know the transmission is over. In yet another variation, a variable period with guard time is used but a maximum period is enforced.

Victim device 401 measures impairments at the start of a connection, and adjusts spectrum usage to avoid any frequency ranges that are strongly affected by crosstalk. In this example, crosstalk victim device 401 measures at time 404 and time 405. Because the non-data-bearing signal 403 has the same PSD as data signal 402, the PSD measured at time 404 has the same value as the PSD measured at time 405. The resulting adjustments which crosstalk victim device 401 makes to its spectrum usage will therefore be effective no matter what point in time the measurements are taken. A deficiency in the crosstalk victim device 401 can therefore be addressed in the disturber (control device 209) by applying the method of the present invention. Further details of the PSD characteristics of the non-data-bearing signal 403 will be discussed later.

Non-data-bearing signal 403 also has at least one characteristic which facilitates echo cancellation of the non-data-bearing signal 403 by the receiver. One such characteristic is periodicity, because the echo of a periodic signal is itself periodic. Turning now to FIGS. 5A and 5B, the nature of a periodic signal which can be used to construct non-data-bearing signal 403 will be discussed. FIG. 5A is a graph of a simple periodic signal 501*a* used by the control device of FIG. 3. Signal 501*a* has period t. FIG. 5B s a graph of another periodic signal, 501*b*, used by another embodiment of the control device of FIG. 3. Signal 501*b* has period 2t, and a first portion 502 and second portion 503. At time t, the phase of first portion 502 is reversed by 180° to produce second portion 503.

The embodiment using signal 501*b* to construct non-data-bearing signal 403 is advantageous in avoiding disruption of the victim's phase and timing recovery processes. To understand why this is so, suppose the disturber uses single phase periodic signal 501*a* as its non-data-bearing signal 403, and that crosstalk victim device 401 happens to use a data signal which is in phase with periodic signal 501*a*. In this case, the data signal received by the victim device 401 from the associated remote end always adds to periodic signal 501*a* (received as crosstalk). This addition may result in errors in victim's data signal, and could disrupt the crosstalk victim's timing recovery processes.

But suppose instead that the disturber uses reversing phase periodic signal 501*b* as its non-data-bearing signal 403. In that case, even if the victim's data signal is perfectly in phase with the first half of periodic signal 501*b*, then by definition it would be perfectly out of phase with the second half, so the additive effects on the victim data signal would cancel each other out.

In yet another embodiment (not shown), two phases 504 and 505 are used, and the phase pseudo-randomly switches at each transmission interval. Like the previous embodiment, the use of phase reversal ensures that on the average the effects on the victim will cancel out. In addition, because the phase is pseudo-random, the non-data-bearing signal 403 is even less likely to be mistaken by the victim for data.

Figure 6A:
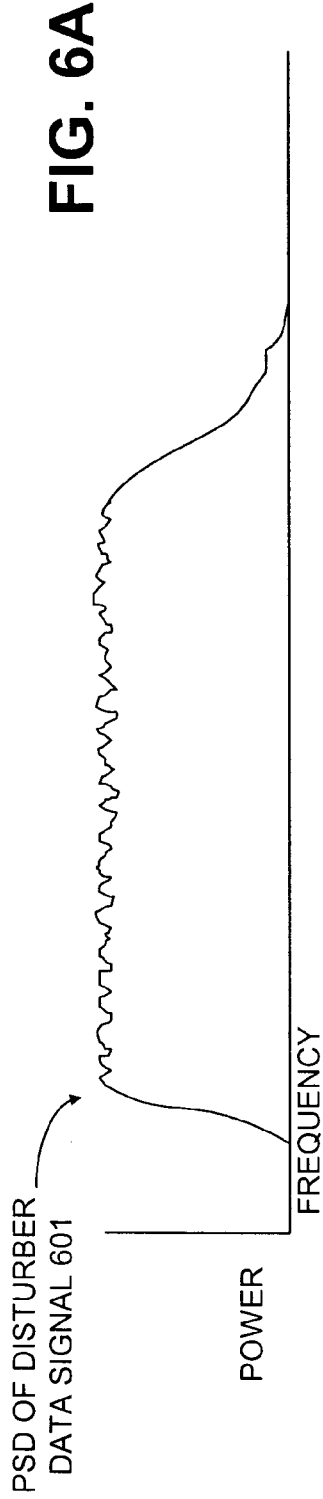
FIG. 6A is a graph of the PSD of the data-bearing signal transmitted by the control device of FIG. 3.
Figure 6B:
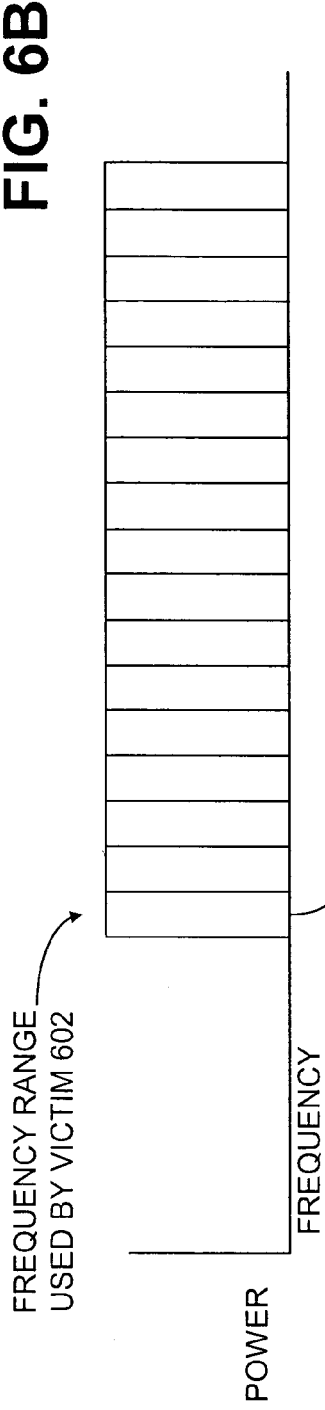
FIG. 6B is a graph of the frequency range in which the crosstalk victim of FIG. 4 is susceptible to crosstalk.
Figure 6C:
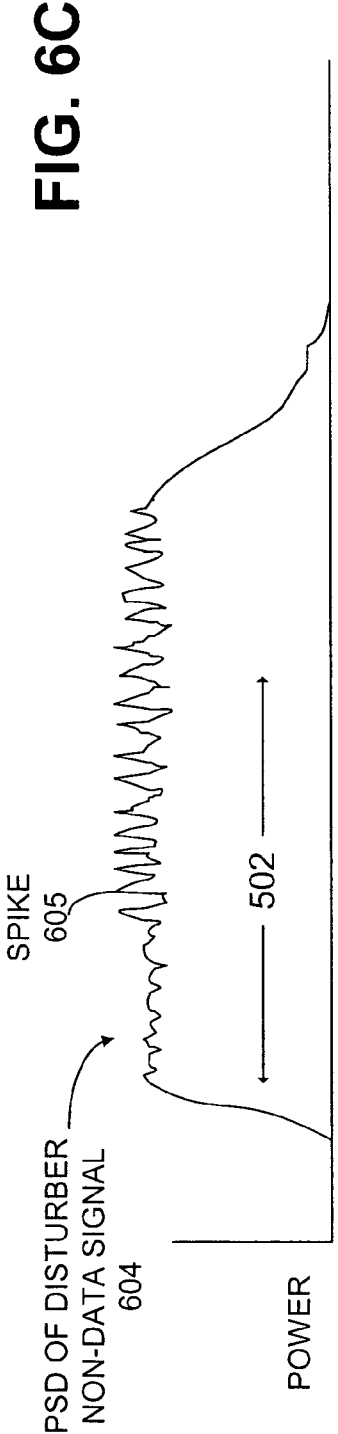
FIG. 6C is a graph of the PSD of the non-data-bearing signal transmitted by the control device of FIG. 3.

As discussed above with reference to FIG. 4, non-data-bearing signal 403 is constructed to have a PSD similar to data signal 402. FIGS. 6A–C illustrate how this is accomplished. FIG. 6A is a graph of the power spectral density (PSD) 601 of the data signal 402 transmitted by control device 209 of FIG. 3. In this example, data signal 402 is transmitted by control device 209 using a single carrier modulation scheme, and the resulting PSD 601 is relatively wide.

FIG. 6B does not show a PSD, but rather the frequency range 602 in which the victim device 401 of FIG. 4 is susceptible to crosstalk. In this example, the victim device 401 uses DMT modulation, in which the spectrum in use is divided into frequency ranges or bins 603.

FIG. 6C is a graph of the PSD 604 of the non-data-bearing signal 403 transmitted by the control device 209 of FIG. 3. This PSD contains frequencies which are used by both victim device 401 in FIG. 6B and by the data signal 402 of control device 209 in FIG. 6A. The PSD 604 is therefore not usually exactly equivalent to the PSD 601 of data signal 402, because PSD 604 contains only these overlapping portions. The PSD of non-data-bearing signal 403 is different from that of data signal 402 in another way. The PSD 604 of non-data-bearing signal 403 contains sharp spikes 605 corresponding to the bins 603 in FIG. 6C, where PSD 601 of data signal 402 is smoother.

The sharp spikes 605 are present because the non-data-bearing signal 403 is a composite signal made of multiple pure sine waves (tones) at frequencies corresponding to the overlap with the bins in FIG. 6B. A composite signal of multiple tones allows the signal to meet the periodicity requirement described above while being trivial to implement. It can be implemented by reading samples out of memory and feeding the samples directly to the digital-to-analog converter. In another embodiment, non-data-bearing signal 403 has the additional characteristic that each bin has constant power over time. This results in measurements that are more accurate when the crosstalk victim device 401 takes measurements over a short period of time.

FIG. 7 is a block diagram of an example embodiment of a transmitter 701 in the control device 209 (acting as a disturber). Transmitter 701 operates as a conventional transmitter with an additional periodic signal generator 702. A conventional control sequencer 703 operates switches 704 and 705 to determine what signal is transmitted.

During a data period, switch 704 selects encoder 706 for normal transmission. Transmit data is encoded by encoder 706, which may use any modulation type such as DMT, quadrature amplitude modulation (QAM), carrierless amplitude/phase (CAP) modulation, or any other modulation for encoding data. The output of the encoder 706 is selected by switch 704 for input to the TX Hilbert filter 707. The Hilbert filter 707 conditions the signal to meet specific transmit spectrum requirements associated with the line.

During initialization, the control sequencer 703 may select train encoder 708. The train encoder 708 generates a special initialization sequence suitable for training adaptive equipment, such as the adaptive equalizer in the receiver of remote device 203 The train encoder 708 may operate in several phases depending on which algorithms are adapting. Phases may include silence, gain control, timing acquisition, carrier phase acquisition, equalization, and other phases. Control sequencer 703 may also select a nominal zero value from block 709 when no signals are to be transmitted. Zero is useful when training a remote echo canceller or the periodic echo canceller of this invention.

Periodic signal generator 702 generates non-data-bearing signal 403. As described above with reference to FIG. 6, non-data-bearing signal 403 is a composite signal made of multiple pure sine waves at frequencies shown in FIG. 6B. In one embodiment, non-data-bearing signal 403 is efficiently generated by reading a series of samples from a store (not shown), and providing the samples to digital-to-analog converter (DAC) 710 at the same symbol rate used by encoder 706.

The control sequencer 703 selects via switch 705 either the non-data-bearing signal 403 or the modulated data signal 402 output from the Hilbert filter 707 for input to the DAC 710. The Hilbert filter 707 is selected when actively transmitting and the non-data-bearing signal 403 is selected while receiving.

In some applications the Hilbert filter 707 may be adaptive, and in this case the non-data-bearing signal 403 is adjusted to match the filter characteristics. One method is to pass the non-data-bearing signal 403 through Hilbert filter 707, using switch 705A to optionally select the non-data-bearing signal 403 for input to Hilbert filter 707. Another method is to use switch 705 to select either the Hilbert filter 707 output, or the periodic signal generator 702 output.

The analog signals output from the DAC 710 are processed by conventional analog circuitry 711 including a final line driver or operational amplifier. Finally, the analog signals are transformer coupled to the communications line.

FIG. 8 is a block diagram of an example embodiment of a receiver 801 in the control device 209 of FIG. 3. Receiver 801 operates as a conventional receiver with an additional periodic echo canceller 802. Any transmitted signal will result in echo at the local receiver, where the echo is produced by impedance mismatch at the hybrid 2-4 wire interface. Conventional echo cancellation involves cancelling echo from data signal 402. This type of echo cancellation requires adaptive filtering, is computation-intensive, and generally cannot remove all distortion.

However, echo generated by a non-data-bearing signal 403 can be efficiently cancelled when non-data-bearing signal 403 is a periodic signal. Echo generated by a periodic signal is itself periodic. Therefore, receiver 801 can build an accurate replica of the periodic echo by simply storing the received echo in memory. Then, the echo can be removed in a manner that is computationally efficient and accurate, by recalling the replica from memory and subtracting it from the received signal.

The non-data-bearing signal 403 is generated continuously by transmitter 701 while receiver 801 simultaneously receives from the remote modem. The received data signal 402 from the remote modem is extracted by conventional hybrid circuitry 803. The non-data-bearing signal 403 is echoed from the transmitted signal back into receiver 801.

The analog signal from hybrid circuitry 803 is converted to digital samples for subsequent digital signal processing by the analog-to-digital converter (ADC) 804. Multiplier 805 and subtraction device 806 process the digital samples from the ADC 804. Subtraction device 806 subtracts a replica of the periodic signal echo, stored in echo store 807, for input to the received signal level (RSL) measuring block 808. The RSL represents the power of the signal from the remote modem with the periodic signal removed. The RSL is used by the Automatic Gain Control (AGC) block 809 to compute the gain G used by multipliers 805 and 810 to scale the received signal from the ADC and the echo signal from the echo store 807 to the appropriate level for input to the adaptive equalizer 811. This design includes adaptation after automatic gain control to improve convergence at low receive signal levels. The AGC will change with line conditions.

Switch 812 selects either the scaled echo signal from multiplier 810 or zero for input to subtraction device 813. Subtraction device 813 subtracts the scaled echo from the scaled received signal output from multiplier 805 to produce an echo-cancelled signal with no echo. The echo-cancelled signal is scaled by a factor of 2n by multiplier 814 for input to the adaptive equalizer 811. The adaptive equalizer 811 compensates the echo-cancelled signal for channel distortion. The equalized signal is then decoded by the data decoder 815 to recover the received data (RXD).

The echo-cancelled signal from subtraction device 813 is scaled by a factor of $2^{ES}$ by multiplier 816 for input to adder 817. Adder 817 adds the echo-cancelled signal to the echo signal from echo store 807 to update the echo samples within the echo store 807. The echo store 807 is a double precision memory array, which stores one full period of the echo.

For rapid initialization, the received echo is simply stored in echo store 807 by opening switch 812 whenever there is no received signal from the remote modem. Then, when there is a received signal, the echo is recalled from echo store 807 and subtracted from the signal by closing switch 812. The result is a high quality echo cancellation leaving a clean signal for the receiver to decode. The shift exponent ES can be set as high as $2^{-4}$ to acquire in less than 40 ms during training when no received signal (only echo) is present. A value as low as $2^{-20}$ can be used for tracking in final data mode with received signal present. The received signal is typically more than 50 dB above the residual echo, requiring very slow adaptation. At the end of each message, the received signal is turned off and additional tracking gain can be applied.

During initialization, the control device 209 selects the non-data-bearing signal 403 for transmission via switch 705, while the remote device 203 selects zero for transmission via switch 704 in his transmitter 701. The control device 209 opens switch 812 to halt echo cancellation and increases the scalar $2^{ES}$ to rapidly store the incoming echo. Many periods of the echo can be accumulated within the echo store 807 by the action of adder 817. This effectively averages many samples of the echo to suppress noise or other external sources of distortion.

During data reception, the control device 209 selects the non-data-bearing signal 403 for transmission via switch 705, while the remote device 203 selects the encoder 706 for transmission via remote switch 704. The local modem control device 209 closes switch 812 to activate echo cancellation and decreases the scalar $2^{ES}$ to slowly track any changes to the incoming echo.

The foregoing description has been presented for purposes of illustration and description. It is not intended to be exhaustive or to limit the invention to the precise forms disclosed. Obvious modifications or variations are possible in light of the above teachings. The embodiments discussed, however, were chosen and described to illustrate the principles of the invention and its practical application to thereby enable one of ordinary skill in the art to utilize the invention in various embodiments and with various modifications as are suited to the particular use contemplated. All such modifications and variation are within the scope of the invention as determined by the appended claims when interpreted in accordance with the breadth to which they are fairly and legally entitled.

Therefore, having thus described the invention, at least the following is claimed:

1. A method for use in a time domain duplexing communication system, the method comprising:
   communicatively coupling a data-bearing signal during a first predetermined time period, the data-bearing signal having a first power spectral density (PSD); and
   communicatively coupling a non-data-bearing signal during a second time in which the data-bearing signal is not coupled, the non-data-bearing signal having a second PSD which is substantially the same as the first PSD over a first range of frequencies, the non-data-bearing signal having characteristics which facilitate echo cancellation.

2. The method of claim 1, wherein communicatively coupling comprises transmitting.

3. The method of claim 1, wherein communicatively coupling comprises receiving.

4. The method of claim 3, further comprising:
   receiving an echo of the non-data-bearing signal; and
   removing the echo.

5. The method of claim 1, wherein the non-data-bearing signal comprises a periodic signal.

6. The method of claim 4, wherein the periodic signal comprises a first portion with a first phase and a second portion with a second phase, where the second phase is an inverse of the first phase.

7. The method of claim 1, wherein the first frequency range includes the entire PSD of the data-bearing signal.

8. The method of claim 1, wherein the communicatively coupling steps are performed by a local device in the time domain duplexing system, wherein the local device is communicatively coupled with a remote device in the time domain duplexing system, and wherein the second time corresponds to a time during which the remote device transmits data to the local device.

9. The method of claim 8, wherein the first time period corresponds to a time during which the remote device does not transmit to the local device.

10. An apparatus in a time domain duplexing communication system, the apparatus comprising:
    a line interface; and
    a transmitter coupled to the line interface, the transmitter comprising:
       a data encoder configured to produce a data-bearing-signal during a first time period assianed to the apparatus, the data-bearing-signal having a first power spectral density (PSD); and
       a periodic signal generator configured to produce a non-data-bearing-signal during the remaining time, the non-data-bearing-signal having a second PSD which is substantially the same as the first PSD over a first range of frequencies, the non-data-bearing signal having characteristics which facilitate echo cancellation.

11. The apparatus of claim 10, further comprising a control sequencer, the control sequencer operating to select for transmission either the data-bearing signal or the non-data-bearing signal.

12. The apparatus of claim 10, wherein the first frequency range does not include the entire PSD of the data-bearing signal.

13. The apparatus of claim 10, further comprising:
    a receiver comprising
       a decoder configured to receive the data-bearing signal; and
       a periodic echo canceller configured to remove the non-data-bearing signal.

14. The apparatus of claim 13, where the receiver further comprises an echo store.

15. The apparatus of claim 10, wherein the apparatus is communicatively coupled to a remote device in the time domain duplexing system, and wherein the remaining period corresponds to a time during which the remote device is allowed to transmit to the apparatus.

16. The apparatus of claim 10, wherein the first predetermined time period has a predetermined length.

17. The apparatus of claim 10, wherein the first predetermined time period has a variable length, and the predetermined time period is followed by a guard time during which no data is transmitted by the apparatus.

18. A computer-readable medium for use in a time domain duplexing communication system, the program comprising:
    logic configured to communicatively couple a data-bearing signal during a first predetermined time period, the data-bearing signal having a first power spectral density (PSD); and
    logic configured to communicatively couple a non-data-bearing signal during a second time other than the first predetermined time period, the non-data-bearing signal having a second PSD which is substantially the same as the first PSD over a first range of frequencies, the non-data-bearing signal having characteristics which facilitate echo cancellation.

19. The program of claim 18, wherein the logic to communicatively couple a non-data-bearing signal further comprises logic to transmit the non-data-bearing signal.

20. The program of claim 18, wherein the logic to communicatively couple a non-data-bearing signal further comprises logic to receive the non-data-bearing signal.

21. The program of claim 18, wherein the communicatively coupling logic is embodied in a local device in the time domain duplexing system, wherein the local device is communicatively coupled to a remote device in the time domain duplexing system, and wherein the second corresponds to a time during which the remote device transmits to the local device.

* * * * *

UNITED STATES PATENT AND TRADEMARK OFFICE
CERTIFICATE OF CORRECTION

PATENT NO. : 7,046,798 B2 Page 1 of 1
APPLICATION NO. : 10/654718
DATED : May 16, 2006
INVENTOR(S) : Betts et al.

It is certified that error appears in the above-identified patent and that said Letters Patent is hereby corrected as shown below:

Column 9, Claim 10, Line 23, change "assianed" to "assigned"

Signed and Sealed this

Twelfth Day of September, 2006

JON W. DUDAS
*Director of the United States Patent and Trademark Office*